(12) United States Patent
Rivera

(10) Patent No.: US 12,169,578 B1
(45) Date of Patent: Dec. 17, 2024

(54) COMPUTING TECHNOLOGIES FOR SELECTIVELY CONTROLLING ACCESS TO DESCRIPTIVE CONTENTS WITHIN PRODUCTIVITY DOCUMENTS

(71) Applicant: EAGLE6 Software, Inc., Jeffersonville, IN (US)

(72) Inventor: Joey Rivera, Jeffersonville, IN (US)

(73) Assignee: EAGLE6 Software, Inc., Jeffersonville, IN (US)

( * ) Notice: Subject to any disclaimer, the term of this patent is extended or adjusted under 35 U.S.C. 154(b) by 227 days.

(21) Appl. No.: 17/982,325

(22) Filed: Nov. 7, 2022

Related U.S. Application Data

(60) Provisional application No. 63/277,483, filed on Nov. 9, 2021.

(51) Int. Cl.
*G06F 21/62* (2013.01)
*G06Q 10/101* (2023.01)

(52) U.S. Cl.
CPC ....... *G06F 21/6218* (2013.01); *G06Q 10/101* (2013.01); *G06F 2221/2141* (2013.01); *G06F 2221/2145* (2013.01)

(58) Field of Classification Search
CPC ......... G06F 21/6218; G06F 2221/2141; G06F 2221/2145; G06Q 10/101
See application file for complete search history.

(56) References Cited

U.S. PATENT DOCUMENTS

| | | |
|---|---|---|
| 7,921,284 B1 | 4/2011 | Kinghorn |
| 8,402,514 B1 | 3/2013 | Thompson |

(Continued)

FOREIGN PATENT DOCUMENTS

| | | |
|---|---|---|
| CN | 109617855 B | 10/2020 |
| JP | 2006048220 A | 2/2006 |
| JP | 2012053810 A | 3/2012 |

OTHER PUBLICATIONS

Drupal, Paragraphs Access Control, URL: https://www.drupal.org/proiect/paragraphs_access downloaded from internet Oct. 27, 2021, (3 pages).

(Continued)

*Primary Examiner* — Sm A Rahman
(74) *Attorney, Agent, or Firm* — Dentons US LLP

(57) ABSTRACT

This disclosure enables various computing technologies for selectively controlling access to descriptive contents within productivity documents. As such, these forms of access control may be technologically useful in work environments involving sensitive information (e.g., classified information, confidential information, private information) by providing granular compartmentalization of the sensitive information within the productivity documents. For example, when the work environments employ collaborative productivity computing environments (e.g., Microsoft Office 365, Microsoft Teams, Google Workspace) to access (e.g., read, edit) the sensitive information, then these forms of access control may provide the granular compartmentalization of the sensitive information within the collaborative productivity computing environments, whether for an individual productivity application or across a suite of productivity applications, while still enabling real-time user collaboration.

34 Claims, 5 Drawing Sheets

(56) References Cited

U.S. PATENT DOCUMENTS

| | | |
|---|---|---|
| 9,213,849 B2 | 12/2015 | Chusing |
| 9,864,876 B2 | 1/2018 | Bjorg |
| 9,934,401 B2 | 4/2018 | van Rotterdam |
| 2006/0080316 A1* | 4/2006 | Gilmore .............. G06F 21/6218 |
| | | 707/999.009 |
| 2006/0089932 A1 | 4/2006 | Buehler |
| 2009/0106247 A1 | 4/2009 | Daughtry |
| 2016/0180107 A1 | 6/2016 | Panchbudhe |
| 2020/0110772 A1* | 4/2020 | Pigulea ................ H04L 65/612 |
| 2021/0210160 A1* | 7/2021 | Shelton ................ G16B 20/20 |

OTHER PUBLICATIONS

Drupal Answers, How limit access to a paragraph type by role, like it is for content types? URL: https://drupal.stackexchange.com/questions/270366/how-limit-access-to-a-paragraph-type-by-role-like-it-is-for-content-types downloaded from internet Oct. 27, 2021, (2 pages).

* cited by examiner

COMPUTING TECHNOLOGIES FOR SELECTIVELY CONTROLLING ACCESS TO DESCRIPTIVE CONTENTS WITHIN PRODUCTIVITY DOCUMENTS

CROSS-REFERENCE TO RELATED PATENT APPLICATION

This patent application claims a benefit of priority to U.S. Provisional Patent Application 63/277,483 filed 9 Nov. 2021, which is incorporated by reference herein for all purposes.

TECHNICAL FIELD

Generally, this disclosure relates to productivity documents. More particularly, this disclosure relates to selectively controlling access to descriptive contents within productivity documents.

BACKGROUND

A productivity document (e.g., a word processing document, a spreadsheet document, a presentation document) may be access controlled to a set of users by permissioning a computing file system (e.g., Microsoft Windows, Linux, MacOS) for the set of users, as needed. If the productivity document contains a set of descriptive content (e.g., text, graphics, worksheets, slides, charts, audio, video) that itself needs to be access controlled to the set of users, then the computing file system is currently not known to have such capability.

SUMMARY

This disclosure enables various computing technologies for selectively controlling access to descriptive contents within productivity documents. As such, these forms of selective access control may be technologically advantageous in work environments involving sensitive information (e.g., classified information, confidential information, private information) by enabling granular compartmentalization of the sensitive information within the productivity documents. For example, when the work environments employ collaborative productivity computing environments (e.g., Microsoft Office 365, Microsoft Teams, Google Workspace) to access (e.g., read, edit) the sensitive information, then these forms of selective access control may enable the granular compartmentalization of the sensitive information within the collaborative productivity computing environments, whether for an individual productivity application or across a suite of productivity applications, while still enabling real-time user collaboration, if available.

DETAILED DESCRIPTION

Figure 1:
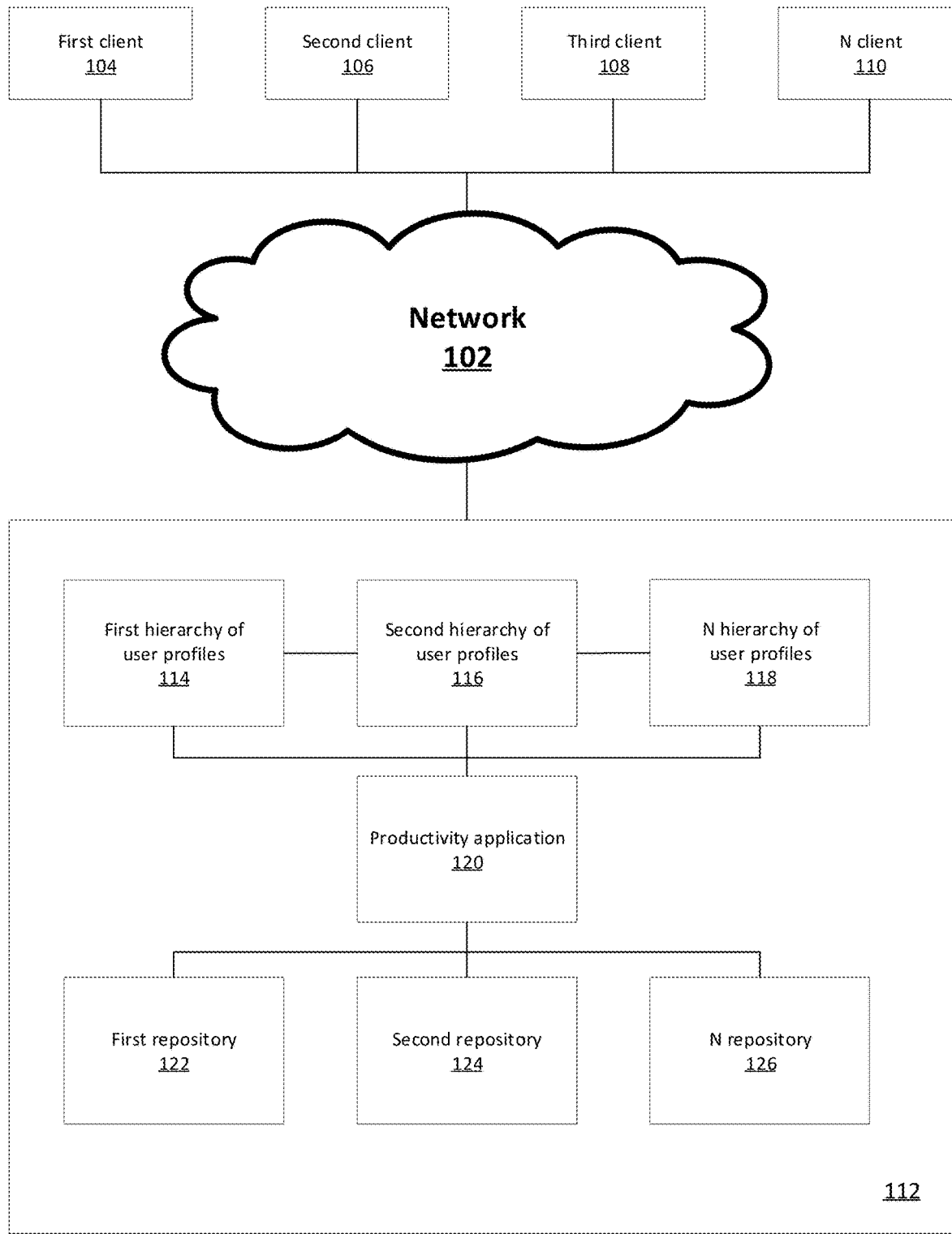
FIG. 1 shows a diagram for an embodiment of an architecture for a system enabled for selectively controlling access to descriptive contents within productivity documents according to this disclosure.

This disclosure enables various computing technologies for selectively controlling access to descriptive contents within productivity documents. As such, these forms of selective access control may be technologically advantageous in work environments involving sensitive information (e.g., classified information, confidential information, private information) by enabling granular compartmentalization of the sensitive information within the productivity documents. For example, when the work environments employ collaborative productivity computing environments (e.g., Microsoft Office 365, Microsoft Teams, Google Workspace) to access (e.g., read, edit) the sensitive information, then these forms of selective access control may enable the granular compartmentalization of the sensitive information within the collaborative productivity computing environments, whether for an individual productivity application or across a suite of productivity applications, while still enabling real-time user collaboration, if available.

This disclosure is now described more fully with reference to FIGS. 1-4B, in which some embodiments of this disclosure are shown. This disclosure may, however, be embodied in many different forms and should not be construed as necessarily being limited to only embodiments disclosed herein. Rather, these embodiments are provided so that this disclosure is thorough and complete, and fully conveys various concepts of this disclosure to skilled artisans.

Note that various terminology used herein can imply direct or indirect, full or partial, temporary or permanent, action or inaction. For example, when an element is referred to as being "on," "connected" or "coupled" to another element, then the element can be directly on, connected or coupled to the other element or intervening elements can be present, including indirect or direct variants. In contrast, when an element is referred to as being "directly connected" or "directly coupled" to another element, there are no intervening elements present.

Likewise, as used herein, a term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

Similarly, as used herein, various singular forms "a," "an" and "the" are intended to include various plural forms (e.g., two, three, four) as well, unless context clearly indicates otherwise. For example, a term "a" or "an" shall mean "one or more," even though a phrase "one or more" is also used herein.

Moreover, terms "comprises," "includes" or "comprising," "including" when used in this specification, specify a presence of stated features, integers, steps, operations, elements, or components, but do not preclude a presence and/or addition of one or more other features, integers, steps, operations, elements, components, or groups thereof. Furthermore, when this disclosure states that something is "based on" something else, then such statement refers to a basis which may be based on one or more other things as well. In other words, unless expressly indicated otherwise, as used herein "based on" inclusively means "based at least in part on" or "based at least partially on."

Additionally, although terms first, second, and others can be used herein to describe various elements, components, regions, layers, or sections, these elements, components, regions, layers, or sections should not necessarily be limited by such terms. Rather, these terms are used to distinguish one element, component, region, layer, or section from another element, component, region, layer, or section. As such, a first element, component, region, layer, or section discussed below could be termed a second element, component, region, layer, or section without departing from this disclosure.

Also, unless otherwise defined, all terms (including technical and scientific terms) used herein have the same meaning as commonly understood by one of ordinary skill in an art to which this disclosure belongs. As such, terms, such as those defined in commonly used dictionaries, should be interpreted as having a meaning that is consistent with their meaning in a context of a relevant art and should not be interpreted in an idealized or overly formal sense unless expressly so defined herein.

Hereby, all issued patents, published patent applications, and non-patent publications (including hyperlinked articles, web pages, and websites) that are mentioned in this disclosure are herein incorporated by reference in their entirety for all purposes, to same extent as if each individual issued patent, published patent application, or non-patent publication were specifically and individually indicated to be incorporated by reference. If any disclosures are incorporated herein by reference and such disclosures conflict in part and/or in whole with the present disclosure, then to the extent of conflict, and/or broader disclosure, and/or broader definition of terms, the present disclosure controls. If such disclosures conflict in part and/or in whole with one another, then to the extent of conflict, the later-dated disclosure controls.

FIG. 1 shows a diagram for an embodiment of an architecture for a system enabled for selectively controlling access to descriptive contents within productivity documents according to this disclosure. In particular, an architecture 100 includes a network 102, a first client 104, a second client 106, a third client 108, an N client 110, and a computing instance 112. The N client 110 is symbolic and represents any number of clients additional to the first client 104, the second client 106, and the third client 108, as needed. However, note that this disclosure can be used with at least one client accessed via different user profiles or at least two clients selected from the first client 104, the second client 106, the third client 108, or the N client 110.

The computing instance 112 hosts a first hierarchy of user profiles 114, a second hierarchy of user profiles 116, an N hierarchy of user profiles 118, a productivity application 120, a first repository 122, a second repository 124, and an N repository 126. The N hierarchy of user profiles 118 is symbolic and represents any number of hierarchies of user profiles additional to the first hierarchy of user profiles 114 and the second hierarchy of user profiles 116, as needed. The N repository is symbolic and represents any number of repositories additional to the first repository 122 and the second repository 124, as needed.

The network 102 includes a plurality of computing nodes interconnected via a plurality of communication channels, which allow for sharing of resources, applications, services, files, streams, records, information, or others. The network 102 can operate via a network protocol, such as an Ethernet protocol, a Transmission Control Protocol (TCP)/Internet Protocol (IP), or others. The network 102 can have any scale, such as a personal area network (PAN), a local area network (LAN), a home area network, a storage area network (SAN), a campus area network, a backbone network, a metropolitan area network, a wide area network (WAN), an enterprise private network, a virtual private network (VPN), a virtual network, a satellite network, a computer cloud network, an internetwork, a cellular network, or others. The network 102 can include an intranet, an extranet, or others. The network 102 can include Internet. The network 102 can include other networks or allow for communication with other networks, whether sub-networks or distinct networks.

Each of the first client 104, the second client 106, the third client 108, and the N client 110 is in communication with the computing instance 112 through the network 102, whether in a wired, wireless, or waveguide manner. Each of the first client 104, the second client 106, the third client 108, and the N client 110 may be embodied in hardware or software. For example, such hardware embodiments may include various computing form factors, such as a desktop, a laptop, a workstation, a tablet, a smartphone, or other suitable computing form factors. Likewise, such software embodiments may include various software form factors such as an application, a productivity application, an add-on for an application, an add-on for a productivity application, a browser, a browser extension, a mobile app, a module, or other suitable software form factors. The first client 104, the second client 106, the third client 108, and the N client 110 may be embodied identically or differently from each other in any permutational manner. For example, the first client 104 may be a productivity application running on a workstation, the second client 106 may be a browser running on a desktop, and the third client 108 may be a mobile app running on a tablet, although these form factors can vary, as needed. If properly configured, then the first client 104, the second client 106, the third client 108, and the N client 110 can communicate with each other through the network 102.

The computing instance 112 includes a cloud computing environment defined via a virtual machine, a set of virtual machines, a server, or a set of servers, whether hardware or virtual, where the set of servers operates in concert, such as via a cluster of servers, a grid of servers, or a group of servers, to perform a computing task, such as reading data, writing data, deleting data, collecting data, sorting data, or other date operations. For example, any of such servers can be a web server, an application server, a database server, or other server form factors. The set of servers can be housed in a data center, a server farm, or other suitable housing form factors. The computing instance 112 can provide a plurality of computing services on-demand, such as an infrastructure as a service (IaaS), a platform as a service (PaaS), a packaged software as a service (Saas), or others. For example, the computing instance 112 can provide computing services from a set of data centers spread across a plurality of availability zones (AZs) in various global regions, where an AZ is a location that contains a plurality of data centers, while a region is a collection of AZs in a geographic proximity connected by a low-latency network link. For example, the computing instance 112 can enable a user to launch a plurality of virtual machines and replicate data in different AZs to achieve a highly reliable infrastructure that is resistant to failures of individual servers or an entire data center. For example, the computing instance 112 can include Amazon Web Services (AWS), Microsoft Azure, Google Cloud, IBM cloud, or others.

Each of the first hierarchy of user profiles 114, the second hierarchy of user profiles 116, and the N hierarchy of user profiles 118 is a data organization (e.g., a data structure, a tree, a graph) that hierarchically lists a set of user profiles according to a set of criteria (e.g., computing privileges, permissions, rights). The set of criteria may differ based on use case. For example, the set of criteria may be based on a security clearance (e.g., top secret versus secret) or employment position (e.g., chief executive officer versus secretary, GS-5 pay scale versus GS-10 pay scale) or computing privileges (e.g., administrative versus non-administrative) with respect to the computing instance 112, with those user profiles with higher security clearances or higher employment positions or more computing privileges are hierarchically listed higher (e.g., closer to a root node or being a root node) than those user profiles with lower security clearances or lower employment positions or less computing privileges. Note that the first hierarchy of user profiles 114, the second hierarchy of user profiles 116, and the N hierarchy of user profiles 118 can be embodied identically or different from each other, depending on use case. For example, the first hierarchy of user profiles 114 can be a first tree and the second hierarchy of user profiles 116 can be a second tree. For example, the first hierarchy of user profiles 114 can be a tree and the second hierarchy of user profiles 116 can be a graph.

Each profile of the first hierarchy of user profiles 114, the second hierarchy of user profiles 116, and the N hierarchy of user profiles is used to access the computing instance 112 (e.g., via passwords, biometrics) and may have hierarchically different computing privileges, permissions, or rights with respect to the computing instance 112 (e.g., the first hierarchy of user profiles 114, the second hierarchy of user profiles 116, the N hierarchy of user profiles 118, the productivity application 120, the first repository 122, the second repository 124, the N repository 126), which may be based on the set of criteria, as noted above. For example, the first client 104 may be logged in to the computing instance 112 via a first user profile included in the first hierarchy of user profiles 114, the second client 106 may be logged in to the computing instance 112 via a second user profile included in the first hierarchy of user profiles 114, and the third client 108 may be logged in to the computing instance 112 via a third user profile included in the first hierarchy of user profiles 114, where the first user profile is hierarchically listed higher (e.g., closer to a root node or being a root node) in the first hierarchy of user profiles 114 than the second user profile and the third user profile, and where the second user profile is hierarchically listed higher (e.g., closer to a root node or being a root node) in the first hierarchy of user profiles 114 than the third user profile and lower than the first user profile. Accordingly, the computing privileges, permissions, or rights with respect to the computing instance 112 may hierarchically differ for the first user profile, the second user profile, and the third user profile.

There may be a superuser user profile (e.g., an administrator user profile) granted a set of superuser (e.g., administrative) computing privileges, permissions, or rights to the computing instance 112 (e.g., the first hierarchy of user profiles 114, the second hierarchy of user profiles 116, the N hierarchy of user profiles 118, the productivity application 120, the first repository 122, the second repository 124, the N repository 126). The superuser user profile may or may not be a root node in any of the first hierarchy of user profiles 114, the second hierarchy of user profiles 116, the N hierarchy of user profiles 118. For example, the superuser user profile may or may not be common to the first hierarchy of user profiles 114 and the second hierarchy of user profiles 116.

The first hierarchy of user profiles 114, the second hierarchy of user profiles 116, and the N hierarchy of user profiles 118 may be editable to add, remove, or modify user profiles therefrom. For example, the superuser user profile may be enabled to add, remove, or modify user profiles from the first hierarchy of user profiles 114, the second hierarchy of user profiles 116, or the N hierarchy of user profiles 118. For example, the superuser profile may have a user interface presented thereto, where the user interface is programmed to enable a superuser to add, remove, or modify user profiles from the first hierarchy of user profiles 114, the second hierarchy of user profiles 116, or the N hierarchy of user profiles 118, as needed. For example, the user interface may allow for menus, forms, drag-and-drop functionality, questionnaires, or other forms of user input to add, remove, or modify user profiles from the first hierarchy of user profiles 114, the second hierarchy of user profiles 116, or the N hierarchy of user profiles 118, as needed. This may be done on a per user basis or for a group of user profiles selected based on various user profile criteria (e.g., demographic identifiers, organizational identifiers).

The first hierarchy of user profiles 114, the second hierarchy of user profiles 116, and the N hierarchy of user profiles 118 can be hosted via a single server within the computing instance 112 or distributed among a group of servers within the computing instance, depending on use case. For example, the first hierarchy of user profiles 114 can be hosted on a first server within the computing instance 112 and the second hierarchy of user profiles 116 can be hosted on a second server within the computing instance 112, where the first server and the second server communicate with each other, if needed.

The productivity application 120 may be a word processing application (e.g., Microsoft Word, Google Docs, LibreOffice Writer), a spreadsheet application (e.g., Microsoft Excel, Google Sheets, LibreOffice Calc), a presentation application (e.g., Microsoft PowerPoint, Google Slides, LibreOffice Impress), an email application (e.g., Microsoft Mail), a personal information manager (PIM) application (e.g., Microsoft Outlook), a notetaking application (e.g., Microsoft OneNote, Google Keep), a database application (e.g., Microsoft Access, LibreOffice Base, Claris Filemaker), a graphics editor (e.g., LibreOffice Draw), a diagramming application (e.g., Microsoft Visio), or other suitable productivity applications.

The productivity application 120 may be a standalone application or a component application of a suite of productivity applications 120, where the suite of productivity applications 120 is hosted within the computing instance 112 similar to the productivity application 120. The suite of productivity applications 120 may or may not share data among its productivity applications 120, depending on use case. The standalone productivity application 120 or the suite of productivity applications 120 can be hosted via a single server within the computing instance 112 or distributed among a group of servers within the computing instance, depending on use case. For example, one productivity application 120 of the suite of productivity applications 120 can be hosted on a first server within the computing instance 112 and another one productivity application 120 of the suite of productivity applications 120 can be hosted on a second server within the computing instance 112, where the first server and the second server communicate with each other, if needed. The standalone productivity application 120 or the suite of productivity applications 120 can be an application(s) locally running on the first client 104, the second client 106, the third client 108, or the N client 110 and in communication with the computing instance 112 to perform various actions disclosed herein (e.g., via periodic synchronization). For example, some of such actions may be triggered via various user input elements (e.g., menus, dropdowns, forms, buttons, questionnaires, drag-and-drop areas) presented on a user interface on the first client 104, the second client 106, the third client 108, or the N client 110, if present. The standalone productivity application 120 or the suite of productivity applications 120 can be an application(s) that is cloud-based hosted by the computing instance 112 and accessible via a dedicated application (e.g., a browser, a browser extension, a mobile app) running on the first client 104, the second client 106, the third client 108, or the N client 110 and in communication with the computing instance 112.

Each of the first repository 122, the second repository 124 and the N repository 126 is a data store programmed to contain at least a set of productivity documents (e.g., at least two productivity documents). For example, each of the first repository 122, the second repository 124 and the N repository 126 can be embodied as a drive, a disk drive, a network drive, a directory, a folder, a workspace, or other suitable form of the data store.

The first repository 122, the second repository 124 and the N repository 126 can be embodied identically or different from each other, depending on use case. For example, the first repository 122 and the second repository 124 can be identical to each other in file system type (e.g., NTFS, APFS) and file system size (e.g., 64 gigabytes, 1 terabyte). For example, the first repository 122 and the second repository 124 can be identical to each other in file system type (e.g., NTFS, APFS), but differ in file system size (e.g., 64 gigabytes, 1 terabyte). Although some operations or actions are described below with respect to the first repository 122, this is not limiting and same or similar operations or actions may take place with respect to the second repository 124 or the N repository 126, if present.

The first repository 122, the second repository 124, and the N repository 126 can be logically isolated or compartmentalized from each other such that data (e.g., files, folders, directories) stored thereon cannot be moved or copied therebetween. However, in certain circumstances, the superuser user profile may or may not be permissioned to do so.

The first repository 122, the second repository 124 and the N repository 126 can be hosted via a single server within the computing instance 112 or distributed among a group of servers within the computing instance, depending on use case. For example, the first repository 122 can be hosted on a first server within the computing instance 112 and the second repository 124 can be hosted on a second server within the computing instance 112, where the first server and the second server communicate with each other, if needed.

In one mode of operation, as further explained below in context of FIGS. 2-4B, the computing instance 112 is programmed to enable various computing technologies for selectively controlling access to descriptive contents within productivity documents. As such, these forms of selective access control may be technologically advantageous in work environments involving sensitive information (e.g., classified information, confidential information, private information) by providing granular compartmentalization of the sensitive information within the productivity documents. For example, when the work environments employ collaborative productivity computing environments (e.g., Microsoft Office 365, Microsoft Teams, Google Workspace) to access (e.g., read, edit) the sensitive information, then these forms of selective access control may provide the granular compartmentalization of the sensitive information within the collaborative productivity computing environments, whether for an individual productivity application or across a suite of productivity applications, while still enabling real-time user collaboration, if available.

In some embodiments, a system may comprise: the computing instance 112 that may be programmed to: host the first repository 122, the second repository 124, the first user profile dedicated to accessing the first repository 122 and not accessing the second repository 124, the second user profile dedicated to accessing the first repository 122 and not accessing the second repository 124, the third user profile dedicated to accessing the first repository 122 and not accessing the second repository 124, and the productivity application 120 operative via the first user profile, the second user profile, and the third user profile. The computing instance 112 that may programmed to create the productivity document in the first repository 122 based on a first user input sourced from the first client 104 logged in as the first user profile such that the productivity document is stored in the first repository 122 and unable to be moved or copied from the first repository 122 to the second repository 124 within the computing instance 112 by the first user profile, the second user profile, and the third user profile. The productivity document may contain a first descriptive content that is editable by the productivity application 120 and a second descriptive content that is editable by the productivity application 120. The first user profile may be permissioned to read the productivity document in its entirety, edit the productivity document in its entirety, and remove the productivity document from the first repository 122. The productivity document may be associated with a creator identifier identifying the first user profile based on the first user input. The computing instance 112 that may programmed to receive a second user input sourced from the second client 106 logged in as the second user profile. The second user profile proxying for the first user profile to assign a read permission for the first descriptive content or the second descriptive content to the third user profile, a no-read permission for the first descriptive content or the second descriptive content to the third user profile, or an edit permission for the first descriptive content or the second descriptive content to the third user profile. The second user profile is permissioned to read the productivity document in its entirety and edit the productivity document in its entirety, but the second user profile is not permissioned to edit the creator identifier and to remove the productivity document from the first repository 122. The computing instance 112 that may programmed to receive a third user input sourced from the third client 108 logged in as the third user profile after assigning the read permission or the edit permission for the first descriptive content to the third user profile based on the second user input and the no-read permission for the second descriptive content to the third user profile based on the second user input. The computing instance 112 that may programmed to allow the productivity application 120 to open the productivity document on the third client 108 based on the third user input such that the first descriptive content is displayed within the productivity application 120 on the third client 108 based on the read permission or the edit permission and the second descriptive content is not displayed within the productivity application 120 on the third client 108 based on the no-read permission. The computing instance 112 that may programmed to revoke the read permission or the edit permission, and the no-read permission from the third user profile based on the third user profile being dedicated to accessing the second repository 124 and not accessing the first repository 122. As such, this disclosure may be performed via at least three user profiles that may be hierarchically different from each other.

In some embodiments, a system may comprise: the computing instance may be programmed to: host the first hierarchy of user profiles 114, the second hierarchy of user profiles 116, the first repository 122, and the second repository 124 such that the first hierarchy of user profiles 114 is permissioned to access the first repository 122 and not the second repository 124 and the second hierarchy of user profiles 116 is permissioned to access the second repository 124 and not the first repository 122. The computing instance 112 that may programmed to receive a creation user input and a permission user input from the first profile of the first hierarchy of user profiles. The creation user input creates the productivity document in the first repository 122 such that the productivity document is stored in the first repository 122 and unable to be moved or copied from the first repository 122 to the second repository 124 within the computing instance 112 by the first user profile. The productivity document may contain a first descriptive content that is editable by the productivity application 120 and a second descriptive content that is editable by the productivity application 120. The first user profile is permissioned to read the productivity document in its entirety, edit the productivity document in its entirety, and remove the productivity document from the first repository 122. The permission user input assigns a read permission for the first descriptive content or the second descriptive content to the second user profile of the first hierarchy of user profiles 114, a no-read permission for the first descriptive content or the second descriptive content to the second user profile, or an edit permission for the first descriptive content or the second descriptive content to the second user profile. The productivity document may be stored in the first repository 122 and unable to be moved or copied from the first repository 122 to the second repository 124 within the computing instance 112 by the second user profile. The first user profile is listed hierarchically higher than the second user profile in the first hierarchy of user profiles 114. The computing instance 112 may be programmed to receive an access request from the second user profile after the read permission or the edit permission for the first descriptive content is assigned to the second user profile based on the permission user input and the no-read permission for the second descriptive content is assigned to the second user profile based on the permission user input. The computing instance 112 may be programmed to allow the productivity application 120 to open the productivity document for the second profile based on the permission user input responsive to the access request such that the first descriptive content is presented within the productivity application 120 for the second user profile based on the read permission or the edit permission and the second descriptive content is not presented within the productivity application 120 for the second user profile based on the no-read permission. The computing instance 112 may be programmed to revoke the read permission or the edit permission, and the no-read permission from the second user profile based on the second user profile being removed from the first hierarchy of user profiles 122 and added to the second hierarchy of profiles 124. As such, this disclosure may be performed via at least two user profiles that may be hierarchically different from each other.

Figure 2:
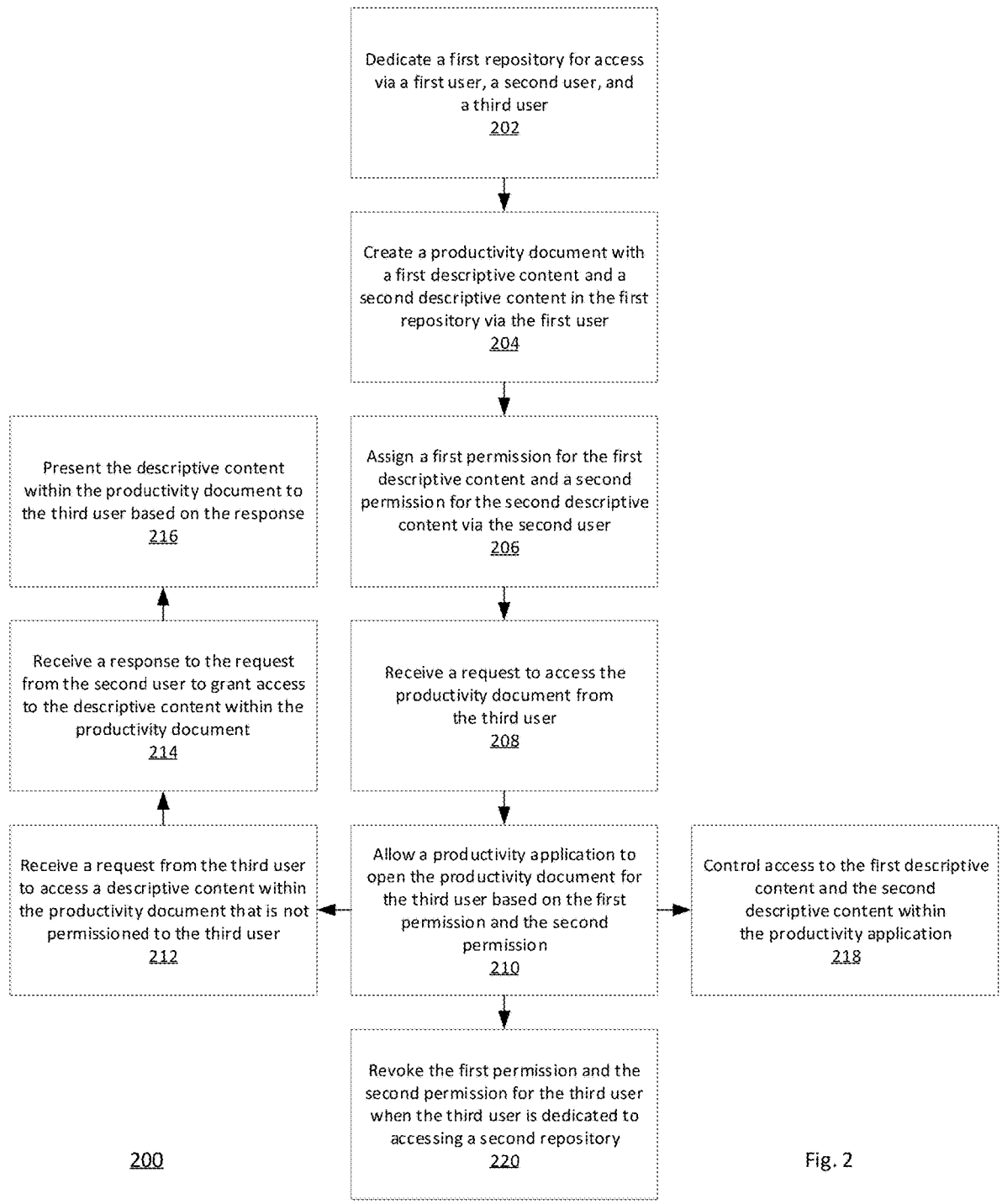
FIG. 2 shows a flowchart for an embodiment of a method for selectively controlling access to descriptive contents within productivity documents according to this disclosure.

FIG. 2 shows a flowchart for an embodiment of a method for selectively controlling access to descriptive contents within productivity documents according to this disclosure. In particular, a method 200 includes a set of blocks 202 to 220. The method 200 is a process that is performed by the architecture 100 shown in FIG. 1. For example, the first client 104, the second client 106, or the third client 108 can communicate with the computing instance 112 over the network 102 to perform the method 200.

The block 202 involves dedicating (e.g., assigning, setting) the first repository 122 for access (e.g., read, write) via a first user (e.g., the first client 104), a second user (e.g., the second client 106), and a third user (e.g., the third client 108). This may occur via the computing instance 112 hosting the first repository 122, the second repository 124, the N repository 126, if present, a first user profile for the first user, a second user profile for the second user, and a third user profile for the third user. The first user profile, the second user profile, and the third user profile are hosted within the first hierarchy of user profiles 114 dedicated (e.g., assigned, set) to accessing (e.g., reading, writing) the first repository 122 and not accessing (e.g., not reading, not writing) the second repository 124 or the N repository 126, if present.

The first hierarchy of user profiles 114 may have a one-to-one correspondence for being permissioned to access (e.g., read, edit, delete) the first repository 122 and not the second repository 124 or the N repository 126, if present. Likewise, the second hierarchy of user profiles 116 may have a one-to-one correspondence for being permissioned to access (e.g., read, edit, delete) the second repository 124 and not the first repository 122 or the N repository 126. Similarly, the N hierarchy of user profiles 118, if present, may have a one-to-one correspondence for being permissioned to access (e.g., read, edit, delete) the N repository 126, if present, and not the first repository 122 or the second repository 124.

This form of one-to-one correspondence between hierarchies of user profiles and repositories may be initially created by the superuser user profile (e.g., via a user interface) and is technologically advantageous because of compartmentalization of information to users. For example, if the first repository 122 may contain productivity documents describing topic A (e.g., intelligence information on topic A) and the second repository 124 may contain productivity documents describing topic B (e.g., intelligence information on topic B), then compartmentalizing such user access based on one-to-one dedication between the hierarchies of user profiles and the repositories minimizes spillage, osmosis, or cross-pollination of intelligence information. For example, the first user profile, the second user profile, and the third user profile can be hosted within the first hierarchy of user profiles 114 assigned to exclusively or only accessing the first repository 122 and not being allowed to access or know of the second repository 124 or the N repository 126, if present. As such, the first user profile, the second user profile, and the third user profile (or other profiles in the first user hierarchy of user profiles 114) can access (e.g., read, edit, delete) data (e.g., productivity documents) stored in the first repository 122 and not (e.g., halt, preclude, ban) be able to access (e.g., read, edit, delete) or know of data (e.g., productivity documents) stored in the second repository 124 or the N repository 126, if present.

Such configuration can occur by assigning (e.g., one-to-one correspondence) the first hierarchy of user profiles 114 to be able to access (e.g., read, edit, delete) data (e.g., productivity documents) stored in the first repository 122 and not (e.g., halt, preclude, ban) be able to access (e.g., read, edit, delete) or know of data (e.g., productivity documents) stored in the second repository 124 or the N repository 126, if present. These forms of assignment (e.g., via the superuser user profile) can be enabled via a user interface that allows for menus, forms, drag-and-drop functionality, questionnaires, or other forms of user input to make such assignments, whether on a per user basis or for a group of user profiles selected based on various user profile criteria (e.g., demographic identifiers, organizational identifiers). For example, if the first client 104 logged in as the first user profile, the second client 106 logged in as the second user profile, or the third client 108 logged in as the third user profile operates the productivity application 120 (e.g., via a respective local instance thereof, a collaborative network-based version), and the first hierarchy of user profiles 114 contains the first user profile, the second user profile, and the third user profile while the first hierarchy of user profiles 114 is one-to-one assigned to accessing the first repository 122 and not the second repository 124 or the N repository 126, if present, then the productivity application 120 (e.g., via a respective local instance thereof, a collaborative network-based version) is able to access (e.g., exclusively or only) the first repository 122 and open a productivity document(s) stored in the first repository 122, but not be able to open or access or know about or not be permissioned to open or access or know about the second repository 124 or the N repository 126, if present. For example, the second repository 124 or the N repository 126, if present, may be hidden or permissioned to be hidden from the productivity application 120 (e.g., via a respective local instance thereof, a collaborative network-based version) if the first client 104 logged in as the first user profile, the second client 106 logged in as the second user profile, or the third client 108 logged in as the third user profile operates the productivity application 120 (e.g., via a respective local instance thereof, a collaborative network-based version) while the first hierarchy of user profiles 114 stores the first user profile, the second user profile, and the third user profile and the first hierarchy of user profiles 114 is dedicated (e.g., exclusively assigned) to accessing the first repository 122 by having a one-to-one correspondence with the first repository 122 and not accessing the second repository 124 or the N repository 126, if present. Therefore, these configurations result in a hierarchy of user profiles having a one-to-one correspondence to a repository through a productivity application (e.g., via a respective local instance thereof, a collaborative network-based version). Accordingly, the first hierarchy of user profiles 114 may have a one-to-one correspondence to the first repository 122 through the productivity application 120 (e.g., via a respective local instance thereof, a collaborative network-based version), the second hierarchy of user profiles 116 may have a one-to-one correspondence to the second repository 124 through the productivity application 120 (e.g., via a respective local instance thereof, a collaborative network-based version), and the N hierarchy of user profiles 118 may have a one-to-one correspondence to the N repository 126 through the productivity application 120 (e.g., via a respective local instance thereof, a collaborative network-based version), if present. Note that although the first user profile, the second user profile, and the third user profile are different user profiles, this is not required and at least two user profiles may be a single user profile.

The block 204 involves creating a productivity document with a first descriptive content and a second descriptive content in the first repository 122 via the first user (e.g., the first client 104). This may occur via the computing instance 112 creating the productivity document in the first repository 122 based on a first user input (e.g., via a user interface) sourced from the first client 104 logged in to the computing instance 112 as the first user profile of the first hierarchy of user profiles 114. The first user input may enable such creation to include the first repository 122 receiving a copy of the productivity document as uploaded from the first client 102 logged in to the computing instance 112 as the first user profile of the first hierarchy of user profiles 114 (or a file sharing site or another data source) or starting a new productivity document in the first repository 122 via the productivity application 120.

The productivity document can include a word processing document, a spreadsheet document, a presentation document, an email document, a calendar document, a task document, a notetaking document, a database document, a graphics document, a diagramming document, or another suitable productivity document. The productivity document contains the first descriptive content and the second descriptive content, which may or may not be identical to each other in size, type, format, or content. The first descriptive content and the second descriptive content can include alphanumerics, text, graphics, diagrams, images, photos, pictures, worksheets, slides, charts, audio, video, words, phrases, sentences, paragraphs, sections, tables, rows, columns, cells, groups of cells, worksheets, slides, maps, diagrams, or other forms of descriptive content suitable for placement into the productivity document. The first descriptive content is editable by the productivity application 120 through the first client 104 logged in to the computing instance 112 as the first user profile of the first hierarchy of user profiles 114. The second descriptive content is editable by the productivity application 120 through the first client 104 logged in to the computing instance 112 as the first user profile of the first hierarchy of user profiles 114.

The productivity document is stored in the first repository 122 and unable to be moved or copied (including its descriptive contents) from the first repository 122 to the second repository 124 or the N repository 126, if present, by the first user profile of the first hierarchy of user profiles 114, the second user profile of the first hierarchy of user profiles 114, and the third user profile of the first hierarchy of user profiles 114. This may occur based on the first repository 122 being dedicated to the first hierarchy of user profiles 114 and the first repository 122, the second repository 124, and the N repository 126 being logically isolated or compartmentalized from each other such that data (e.g., files, folders, directories) stored thereon cannot be moved or copied therebetween, although in certain circumstances the superuser user profile may or may not be permissioned to do so.

The first user profile of the first hierarchy of user profiles 114 is permissioned to read the productivity document in its entirety (e.g., via the productivity application 120), edit the productivity document in its entirety (e.g., via the productivity application 120), and remove (e.g., delete, erase) the productivity document from the first repository 122 (e.g., via the productivity application 120 or a user interface external to the productivity application 120). This may be technologically advantageous because the first user profile may be associated with the first user who is "in charge" or "owns" the productivity document, i.e., a creator of the productivity document. For example, the first user may be an intelligence officer (e.g., supervisor) in an intelligence organization, where the intelligence officer is responsible for collecting intelligence on topic A, oversees or supervises various lower officers (e.g., supervisees), and is decision-maker based on the productivity document including the first descriptive content and the second descriptive content. As such, the productivity document is associated with a creator identifier (e.g., a user profile identifier) identifying the first user profile operating the first client 104 based on the first user input that created the productivity document with the first descriptive content and the second descriptive content.

The block 206 involves assigning a first permission for the first descriptive content and a second permission for the second descriptive content via the second user (e.g., the second client 106). This may occur via the computing instance 112 receiving a second user input sourced from the second client 106 logged in to the computing instance 112 as the second user profile of the first hierarchy of user profiles 114.

The second user profile may be proxying for the first user profile to assign a read permission for the first descriptive content or the second descriptive content to the third user profile, a no-read permission for the first descriptive content or the second descriptive content to the third user profile, or an edit permission for the first descriptive content or the second descriptive content to the third user profile. This proxying may be technologically advantageous when there many user profiles in the first hierarchy of user profiles 114 and the first user profile proxies (e.g., to save time) some of its computing privileges, permissions, and rights at least with respect to the productivity document with the first descriptive content and the second descriptive content stored in the first repository 122, while still maintaining its own computing privileges, permissions, and rights at least with respect to the productivity document with the first descriptive content and the second descriptive content stored in the first repository 122. For example, the computing instance 112 may present a user interface to the first user profile such that the first user profile selects the second user profile as its proxy. Such selection may occur based on selecting or inputting a profile identifier corresponding to the second user profile. Further, such selection may occur in many ways where the user interface may allow for menus, forms, drag-and-drop functionality, questionnaires, or other forms of user input for the first user profile to select the second user profile as its proxy, while still maintaining its own computing privileges, permissions, and rights at least with respect to the productivity document with the first descriptive content and the second descriptive content stored in the first repository 122. This selection may be done on a per user basis or for a group of user profiles selected based on various user profile criteria (e.g., demographic identifiers, organizational identifiers). For example, there may be a single user profile or a set of user profiles selected as proxies by the first user profile.

The second user profile receives its permissions by proxy from the first user profile within the computing instance 112. As such, the second user profile may be permissioned to read the productivity document in its entirety and edit the productivity document in its entirety. However, the second user profile may not permissioned to edit the creator identifier and to remove the productivity document from the first repository, although in certain circumstances the superuser user profile may or may not be permissioned to do so. This may technologically advantageous because the second user profile may be hierarchically lower (e.g., a low ranked intelligence officer, an assistant to a supervisor) than the first user profile in the first hierarchy of user profiles 114.

The second user profile may assign the first permission for the first descriptive content and the second permission for the second descriptive content via operating a user interface presented to the second user profile (e.g., via the second client 106). The user interface may be internal to the productivity application 120 or external to the productivity application 120 but within the computing instance 112. Such assignment may occur in various ways. For example, the second user profile can select or highlight the first descriptive content and then select or input a user identifier (e.g., the third user profile) and then select or input the first permission for the user identifier. This sequence may vary where the second user profile can select or input the user identifier (e.g., the third user profile) and then select or highlight the first descriptive content and then select or input the first permission for the user identifier. Similar actions may apply for assigning the second permission for the second descriptive content or other descriptive content, if present. Other sequences of these actions are possible and such selection may occur in many ways where the user interface may allow for menus, forms, drag-and-drop functionality, questionnaires, or other forms of user input for the second user profile to assign the first permission for the first descriptive content and the second permission for the second descriptive content with respect to the third user profile. This assignment may be done on a per user basis or for a group of user profiles selected based on various user profile criteria (e.g., demographic identifiers, organizational identifiers). For example, there may be a single user profile or a set of user profiles assigned to the first descriptive content by the second user profile. Note that if the first user profile and the second user profile are a single user profile (no proxy), then the first user profile assigns the first permission for the first descriptive content and the second permission for the second descriptive content via operating the user interface presented to the first user profile (e.g., via the first client 104).

When the first permission for the first descriptive content or the second permission for the second descriptive content is assigned via the second user profile with respect to the third user profile, the first descriptive content or the second descriptive content may become visually distinct, which may be in real-time, respectively relative the first descriptive content or the second descriptive or other descriptive content within the productivity document. Note that a vice versa configuration when the first permission or the second permission is changed or removed may be possible as well. This form of visual distinction may be based on color or other formatting techniques. For example, the first descriptive content may change in font color, background color, highlight color, bolding, italicizing, underlining, font size, font type, or other visual distinct ways. For example, the productivity application 120 may present a bounding box (e.g., rectangular) enclosing the first descriptive content or the second descriptive content, if permissioning is identical with respect to the third user profile. If there are multiple bounding boxes, then those multiple bounding boxes may be visually distinct from each other if permissions are different from each other with respect to the third user profile or may not be visually distinct if multiple descriptive contents share identical permissions with respect to the third user profile. Note that when the productivity application 120 has a work area (e.g., a white space into which descriptive content is entered), then such visual notifications of permissions being assigned may be internal to the work area or may be external to the work area. For example, when the productivity application 120 has a menu, a ribbon, or a set of grays areas between which the work area is interposed, then such visual notifications may appear on or over the menu, the ribbon, or any gray areas of the set of grays areas.

If the first permission for the first descriptive content or the second permission for the second descriptive content is the no-read permission, then this configuration may be enabled to occur in various ways. For example, the no-read permission may be an affirmative no-read permission for the first descriptive content or the second descriptive content to the third user profile. As such, the second user profile may input or select a corresponding user input element (e.g., a checkbox, a button) in the user interface (e.g., internal to the productivity application 120, external to the productivity application 120) that affirmatively assigns the no-read permission for the first descriptive content or the second descriptive content. However, this is not required because the no-read permission may also be based on an absence of the read permission for the first descriptive content or the second descriptive content to the third user profile or an absence of the edit permission for the first descriptive content or the second descriptive content to the third user profile. As such, if the second user profile did not assign the read permission for the first descriptive content or the second descriptive content to the third user profile or the second user profile did not assign the edit permission for the first descriptive content or the second descriptive content to the third user profile, then the computing instance 112 may treat such absence (e.g., inaction) as the no-read permission. Note that the read permission may not necessarily include the edit permission, but the edit permission includes the read permission.

The third user profile may be a team profile corresponding to a group of user profiles other than the first user profile and the second user profile. As such, the second user profile (or the first user profile) may permission the first descriptive content and the second descriptive content for every user profile referenced or identified (e.g., by a user profile identifier) in the team profile. This may be technologically advantageous when there are groups of users dealing with similar content.

The block 208 involves receiving a request to access the productivity document from the third user. This may occur via the computing instance 112 receiving the request from the third user profile logged in to the computing instance 112 as the third user profile of the first hierarchy of user profiles 114. The request is a third user input is received after the first descriptive content and the second descriptive content are permissioned for access to the third user profile via the second user profile.

The block 210 involves allowing the productivity application 120 to open the productivity document for the third user logged in to the computing instance 112 as the third user profile from the first hierarchy of user profiles 114 based on the first permission and the second permission. This may occur via the computing instance 112 enabling the productivity application to open the productivity document for the third user based on the first permission and the second permission. As such, whatever descriptive content the second user profile permissioned the third user profile to read or edit will be shown to the third user profile on the third client 108. In contrast, whatever descriptive content the second user profile did not permission the third user profile to read or edit will not be shown (e.g., displayed) to the third user profile on the third client 108. For example, the second descriptive content may not displayed by being hidden (e.g., cannot readily tell that exists) within the productivity application 120 on the third client 108 based on the no-read permission. The second descriptive content may not displayed by being blocked-off (e.g., overlaid by opaque or translucent or frosted space) within the productivity application 120 on the third client 108 based on the no-read permission. As such, the productivity document within the productivity application 120 may appear partially incomplete to the third user profile. This may be technologically advantageous in work environments involving sensitive information (e.g., classified information, confidential information, private information) by enabling granular compartmentalization of the sensitive information within the productivity document.

When the productivity application 120 opens the productivity document permissioned for the first descriptive content and the second descriptive content, as described above, the productivity application 120 may present a visual notice (e.g., text, graphics, images) of the second descriptive content not being displayed on the third client logged in as the third user profile based on the no-read permission. If the productivity application includes a document area (e.g., a white space for entry of a descriptive content), then the document area containing the first descriptive content and the visual notice. The document area may present the visual notice over an area where the second descriptive content is positioned in the productivity document when displayed (e.g., when permissioned). The visual notice may be color-coded to be visually distinct relative to the first descriptive content. If the productivity application 120 includes a command menu (e.g., a ribbon) for the productivity document and a document area (e.g., a white space for entry of a descriptive content) containing the first descriptive content, then the visual notice may be presented on the command menu, where the command menu is positioned adjacent (e.g., above, below, lateral) to the document area. If the productivity application 120 includes a command menu (e.g., a ribbon) for the productivity document and a document area (e.g., a white space for entry of a descriptive content) containing the first descriptive content, then the visual notice may be external to the command menu and the document area (e.g. a set of grays areas between which the work area is interposed), where the command menu is positioned adjacent (e.g., above, below, lateral) to the document area.

The block 212 involves receiving a request from the third logged in to the computing instance 112 via the third client 108 as the third user profile of the first hierarchy of user profiles 114 to access a descriptive content within the productivity document that is not permissioned to the third user. For example, the computing instance 112 may receive the request sourced from the third client 108 logged in as the third user profile, where the request requests the grant of the read permission or the edit permission to the second descriptive content for the third user profile when the second permission previously denied the read permission or the edit permission for the second descriptive content to the third user profile. This may occur if the third user decides when viewing the productivity document within the productivity application 120 that the third user needs access to whatever descriptive content the second user profile did not permission the third user profile to read or edit. As such, the third user logged in to the computing instance 112 via the third client 108 may submit the request to access to whatever descriptive content the second user profile did not permission the third user profile to read or edit. The request may occur via a user interface internal to the productivity application 120 or external to the productivity application 120.

The block 214 involves receiving a response to the request from the second user logged in to the computing instance 112 via the second client 106 as the second user profile of the first hierarchy of user profiles 114 to grant access to the descriptive content within the productivity document. For example, the computing instance 112 may receive the response to the request from the second client 106 logged in as the second user profile, where the response provides the grant of the read permission or the edit permission to the second descriptive content for the third user profile such that the second descriptive content is displayed within the productivity application 120 on the third client 108 logged in at the third user profile based on the grant. This may occur via the second user profile being notified of the request (e.g., via an email, a chat message) via the computing instance 112 and generating the response to the request by granting or denying access to the request via the computing instance 112, which may include a textual explanation thereof input via the second user profile. If the request is granted, then the response may communicate such grant to the third user profile and access to whatever descriptive content the second user profile did not permission the third user profile to read or edit will then be granted, which may be in real-time. If the request is denied, then the response may communicate such grant to the third user profile and maintain preclusion, ban, or denial of access to whatever descriptive content the second user profile did not permission the third user profile to read or edit. The third user profile may submit another request for access to whatever descriptive content the second user profile did not permission the third user profile to read or edit, or be precluded therefrom (e.g., permanently, temporarily). For example, the computing instance 112 may present the user interface within the productivity application 120 to the third client 108 logged in as the third user profile, where the user interface presents the first descriptive content based on the first permission (e.g., the read permission or the edit permission) and does not present the second descriptive content based on the second permission (e.g., the no-read permission). The user interface may present a user input element (e.g., a button, a checkbox) external to the first descriptive content, where the user input element is programmed to initiate the request upon activation of the user input element by the third client 108 such that the second descriptive content is presented within the user interface based on the response being received. Since the productivity document may have a format, where the computing instance 112 may display the second descriptive content within the user interface on the third client 108 logged in at the third user profile based on the grant such that the format of the productivity document does not change. For example, there may be some space (e.g., white space) reserved for the second descriptive content before the response is received and the second descriptive content is presented within the space such that the format does not change. However, this configuration may vary and there may not be any space reserved for the second descriptive content. As such, when the second descriptive content appears within the productivity document based on the response, some descriptive content, whether above or below or lateral to the second descriptive content, may move or the format of the productivity document may change to accommodate for insertion of the second descriptive content based on response.

The block 216 involves presenting the descriptive content within the productivity document to the third user based on the response. This may occur via the computing instance 112 inserting or unhiding, based on the request being granted, access to whatever descriptive content the second user profile did not permission the third user profile to read or edit will is granted, which may be in real-time.

The block 218 control access to the first descriptive content or the second descriptive content within the productivity application. This may occur via the computing instance 112 monitoring whether the first descriptive content or the second descriptive content are being access via another software application (e.g., screen capture, screenshot tool, videoconferencing client).

The block 220 involves revoking the first permission and the second permission for the third user logged in to the computing instance 112 via the third client 108 as the third user profile of the first hierarchy of user profiles 114 when the third user is dedicated to accessing the second repository 124. For example, the first permission may include the read permission or the edit permission for the first descriptive content and the no-read permission for the second descriptive content. The permission may be revoked from the third user profile based on the third user profile being dedicated (e.g., assigned) to accessing the second repository 124 and not accessing the first repository 122, as described above. For example, the third profile identifier may be removed from the first hierarchy of user profiles 114 and added to the second hierarchy of user profiles 116 via the second user profile (e.g., via a menu, questionnaire, form, drag-and-drop operation). The third profile identifier may be removed from the first hierarchy of user profiles 114 and added to the second hierarchy of user profiles 116 via the first user profile (e.g., via a menu, questionnaire, form, drag-and-drop operation). The third profile identifier may be removed from the first hierarchy of user profiles 114 and added to the second hierarchy of user profiles 116 via the superuser user profile (e.g., via a menu, questionnaire, form, drag-and-drop operation). For example, the computing instance 112 may be programmed to revoke the read permission or the edit permission, and the no-read permission from the third user profile based on the third user profile being dedicated to accessing the second repository 124 and not accessing the first repository 122 in response to receiving a revocation input sourced from the first client 104 logged in as the first profile or the second client 106 logged in as the second profile. For example, the computing instance 112 may host the first hierarchy of user profiles 114 permissioned to access the first repository 122 and not the second repository 124 (or the N repository 126 if present) and the second hierarchy of user profiles 116 permissioned to access the second repository 124 and not the first repository 122 (or the N repository 126 if present). The first hierarchy of user profiles 114 may contain the first user profile, the second user profile, and the third user profile, where the first user profile is listed hierarchically higher than the second user profile and the third user profile in the first hierarchy of user profiles 114, and where the second user profile is listed hierarchically higher than the third user profile in the first hierarchy of user profiles 114. The computing instance 112 may revoke the read permission or the edit permission, and the no-read permission from the third user profile based on the third user profile being dedicated to accessing the second repository 124 and not accessing the first repository 122 (or the N repository 126 if present) via removing the third user profile from the first hierarchy of user profiles 114 and adding the third user profile to the second hierarchy of user profiles 116.

Since there may be a one-to-one correspondence between the first hierarchy of user profiles 114 and the first repository 122, when the third user profile is assigned from the first hierarchy of user profiles 114 to the second hierarchy of user profiles 116 (e.g., moved from one organizational department to another), the third user profile is no longer permissioned to the first repository 122 and the first permission for the first descriptive content and the second permission for the second descriptive content is revoked for the third user profile. This assignment may occur via removing the third user profile from the first hierarchy of user profiles 114 and adding the third user profile to the second hierarchy of user profile 116. This may be may be technologically advantageous in work environments involving sensitive information (e.g., classified information, confidential information, private information) by enabling granular (e.g., for the first descriptive content and the second descriptive content) compartmentalization of the sensitive information within the productivity documents.

The first permission or the second permission for the productivity document may be inherited downstream in the first repository 122 when the productivity document is copied or a new version of the productivity document is formed within the first repository 122. For example, the computing instance may form a copy or a new version of the productivity document in the first repository such that the copy or the new version contains the first descriptive content and the second descriptive content and inherits the first permission (e.g., the read permission or the edit permission to the first descriptive content for the third user profile) and the second permission (e.g., the no-read permission to the second descriptive content for the third user profile). The computing instance 112 may allow the productivity application 120 to open the copy or the new version on the third client 108 such that the first descriptive content of the copy or the new version is displayed within the productivity application 120 on the third client 108 based on the first permission (e.g., the read permission or the edit permission as inherited) and the second descriptive content of the copy is not displayed within the productivity application 120 on the third client 108 based on the second permission (e.g., the no-read permission as inherited). The computing instance 112 may revoke the first permission (e.g., the read permission or the edit permission as inherited), and the second permission (e.g., the no-read permission as inherited) from the third user profile based on the third user profile being dedicated (e.g., assigned) to accessing the second repository 124 and not accessing the first repository 124.

Each of the first user profile dedicated to accessing the first repository 122 and not accessing the second repository 124, the second user profile dedicated to accessing the first repository 122 and not accessing the second repository 124, and the third user profile dedicated to accessing the first repository 122 and not accessing the second repository 124 may be respectively based on each of the first user profile, the second user profile, and the third user profile being assigned to a tree (or a graph or a data structure or another data organization disclosed herein) that hierarchically lists a first profile identifier corresponding to the first user profile, a second profile identifier corresponding to the second user profile, and a third profile identifier corresponding to the third user profile, as explained above. The tree may correspond to the first repository 122 and not the second repository 124, as explained above. As such, if the tree is a first tree corresponding to or embodied as the first hierarchy of user profiles 114, then the computing instance 112 may revoke the first permission (e.g., the read permission or the edit permission) for the first descriptive content and the second permission (e.g., the no-read permission) for the second descriptive content from the third user profile based on the third user profile being dedicated to accessing the second repository 124 and not accessing the first repository 122 responsive to the third profile identifier being removed from the first tree and added to a second tree corresponding to the second repository 124 and not the first repository 122. The third profile identifier may be removed from the first tree and added to the second tree via a drag-and-drop operation or another operation on the user interface (e.g., menu, questionnaire). As such, the third profile identifier may be removed from the first tree and added to the second tree via the second user profile. The third profile identifier may be removed from the first tree and added to the second tree via the first user profile.

The computing instance 112 (e.g., the productivity application 120) may be programmed to enable the first descriptive content or the second descriptive content to not be displayed (e.g., hidden, overlaid with opaque or translucent or frosted content) within the productivity application 120 if no-read permissioned to the third user profile logged in to the computing instance 112 via the third client 108 (e.g., based on the no-read permission) when the productivity application 120 is shared via a videoconferencing session or accessed via a screen-capture application. This may occur based on the computing instance 112 presenting the productivity application 120 within a window and monitoring for any windows sharing the window. Since this may be an attempt to circumvent permissions, as described above, if such any such windows are detected, then the computing instance 112 may instruct the productivity application 120 to not display the first descriptive content or the second descriptive content to not be displayed (e.g., hidden, overlaid with opaque or translucent or frosted content) within the productivity application 120 if no-read permissioned to the third user profile.

The computing instance 112 may be programmed to receive a request sourced from the third client logged in as the third user profile, where the request requests a copy of the productivity document to be downloaded or emailed to a fourth user profile other than the first user profile and the second user profile. Since this may be an attempt to circumvent permissions, as described above, the computing instance 112 may omit or remove the first descriptive content or the second descriptive content that is no-read permissioned from the copy before the copy is made available for download or emailing to the fourth user profile.

The computing instance 112 may permission for the first descriptive content or the second descriptive content based on reading a set of entries stores in a log (e.g., an access log) in existence before the second user profile permissions the first descriptive content or the second descriptive content (e.g., before receiving the second user input from the second client logged in as the second user profile) or to avoid the second user profile permissioning the first descriptive content or the second descriptive content. For example, the computing instance 112 may assign the read permission for the first descriptive content or the second descriptive content to the third user profile, the no-read permission for the first descriptive content or the second descriptive content to the third user profile, or the edit permission for the first descriptive content or the second descriptive content to the third user profile based accessing the log stored on the computing instance 112 and reading the set of entries stored in the log in existence before receiving the second user input from the second client logged in as the second user profile.

When the productivity application 120 is a first productivity application 120 (e.g., a word processing application) and the computing instance 112 hosts a second productivity application 120 (e.g., a spreadsheet application), which may both be included in a suit of productivity applications 120 hosted via the computing instance 112, there may be shared permissioning between the first productivity application 120 and the second productivity application 120. For example, the computing instance 112 may be programmed to receive a fourth user input sourced from the third client 108 logged in to the computing instance 112 as the third user profile after the read permission or the edit permission for the first descriptive content is assigned to the third user profile based on the second user input and the no-read permission for the second descriptive content is assigned to the third user profile based on the second user input. The computing instance 112 may allow the second productivity application 120 to open a second productivity document on the third client 108 based on the fourth user input such that the first descriptive content is displayed within the second productivity application 120 on the third client 108 based on the read permission or the edit permission and the second descriptive content is not displayed within the second productivity application 120 on the third client 108 based on the no-read permission.

The computing instance 112 may include a file system (e.g., NTFS, APFS) and may permission independent of the file system or in concert with the file system. For example, the computing instance 112 may assign the read permission or the edit permission for the first descriptive content to the third user profile based on the second user input and the no-read permission for the second descriptive content to the third user profile independent of the file system. As such, the file system may operate independent of how permissioning for descriptive content within productivity document. However, this configuration may vary and the computing instance 112 may assign the read permission or the edit permission for the first descriptive content to the third user profile based on the second user input and the no-read permission for the second descriptive content to the third user profile in concert with the file system. As such, the productivity document itself may be first permissioned for a desired group of user profiles and then those user profiles may be assigned to hierarchy of user profiles to allow for permissioning, as disclosed herein.

Figure 3:
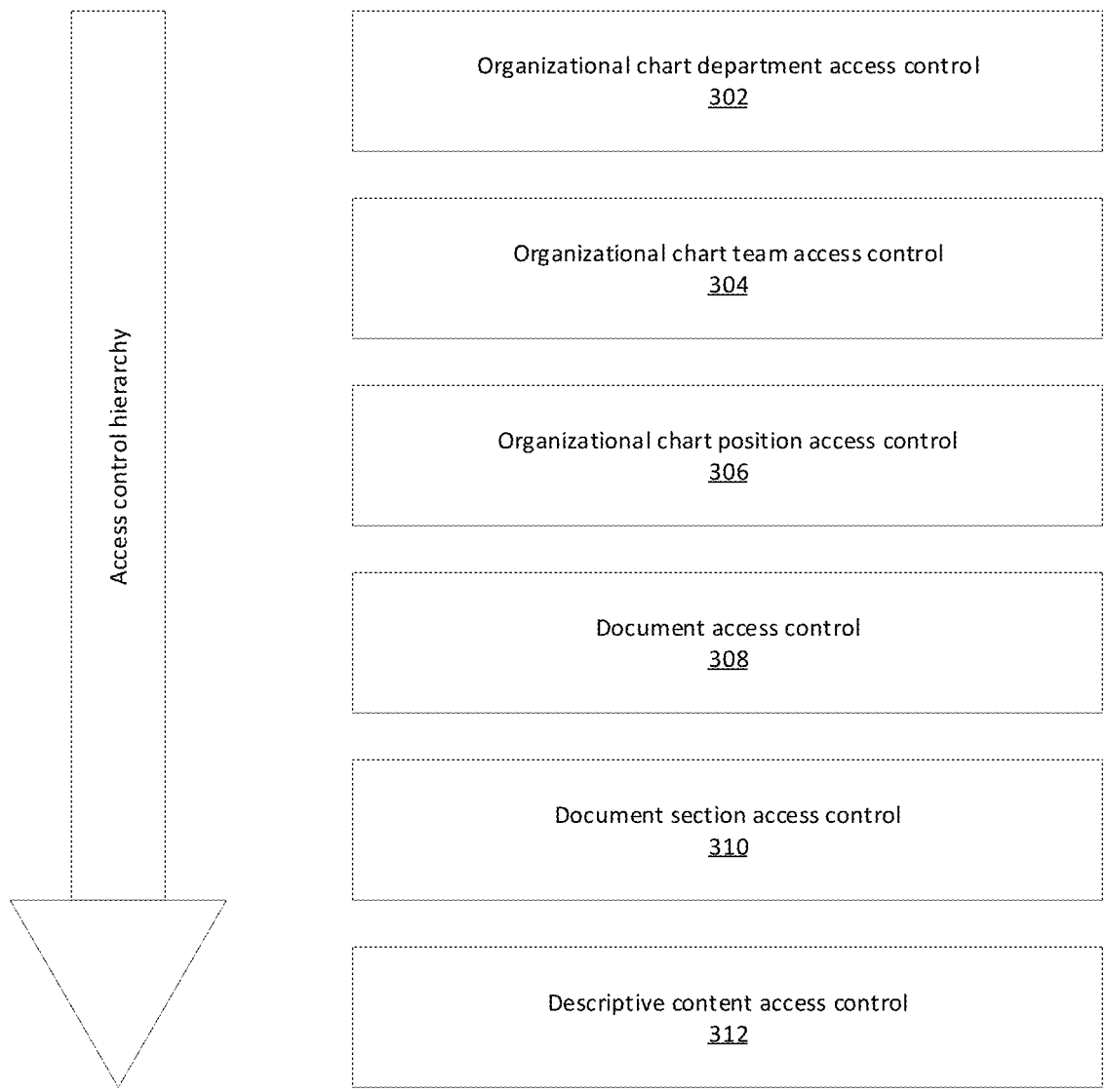
FIG. 3 shows a diagram for an embodiment of an access control hierarchy according to which access to descriptive contents within productivity documents can be selectively controlled according to this disclosure.

FIG. 3 shows a diagram for an embodiment of an access control hierarchy according to which access to descriptive contents within productivity documents can be selectively controlled according to this disclosure. As illustrated, the computing instance 112 may employ an access control hierarchy which may further selectively control access to descriptive contents within productivity documents, as disclosed herein, by taking into account an organizational chart department access control 302, an organizational chart team access control 304, an organizational chart position access control 306, a document access control 308, a document section access control 310, and a descriptive control access control 312.

Figure 4A:
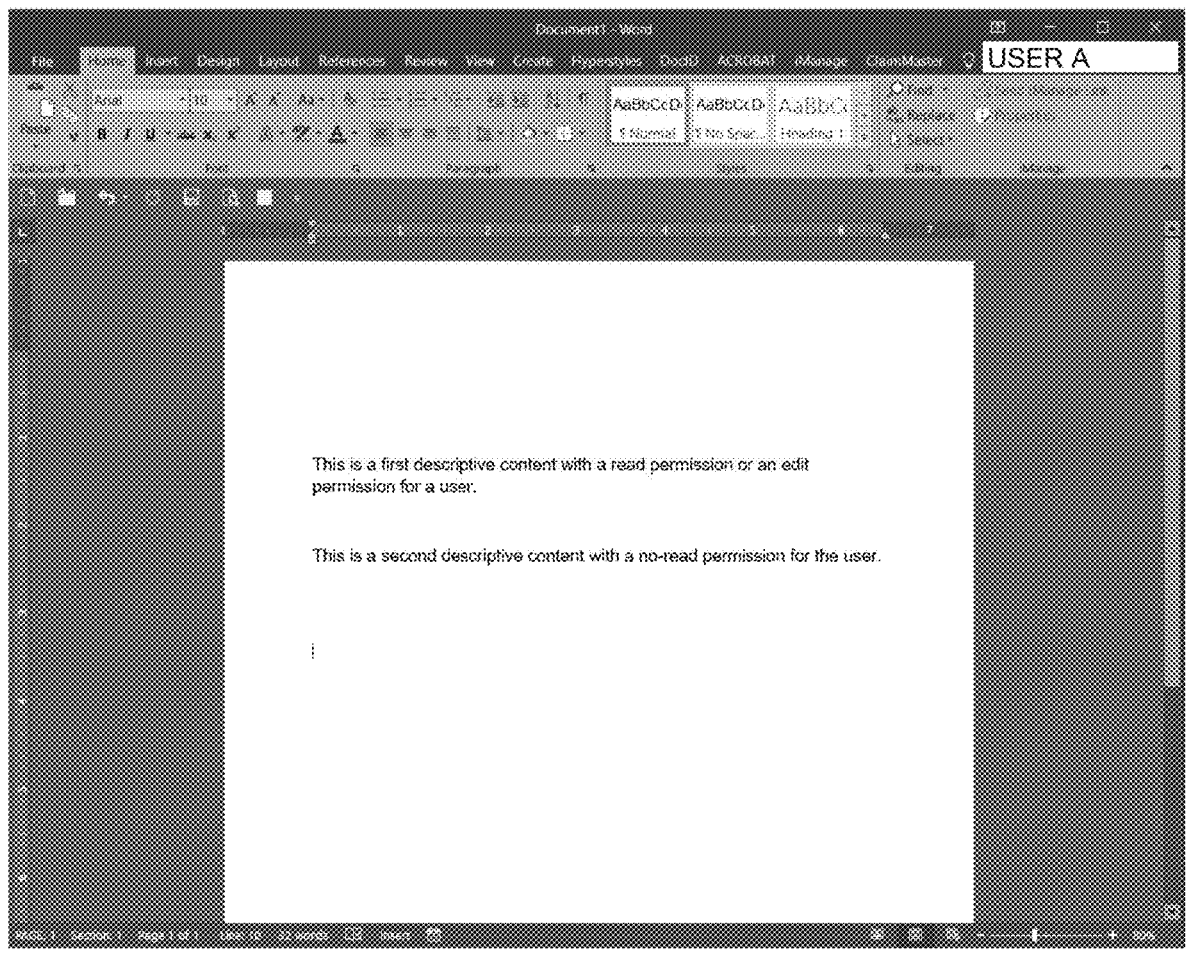
FIG. 4A shows a screenshot of an embodiment of a productivity document with a first descriptive content permissioned for a first user profile (User A) and a second descriptive content permissioned for a second user profile (User B) when the productivity document is opened via the first user profile according to this disclosure.

FIG. 4A shows a screenshot of an embodiment of a productivity document with a first descriptive content permissioned for a first user profile (User A) and a second descriptive content permissioned for a second user profile (User B) when the productivity document is opened via the first user profile according to this disclosure. As illustrated, the productivity document is opened by the productivity application 120 for a User A embodied as the first user profile or the second user profile, as explained above. The productivity document contains the first descriptive content reciting "This is a first descriptive content with a read permission or an edit permission for a user." The productivity document contains the second descriptive content reciting "This is a second descriptive content with a no-read permission for the user." Since the User A is embodied as the first user profile or the second user profile, the productivity application 120 presents the first descriptive content and the second descriptive content to the User A.

Figure 4B:
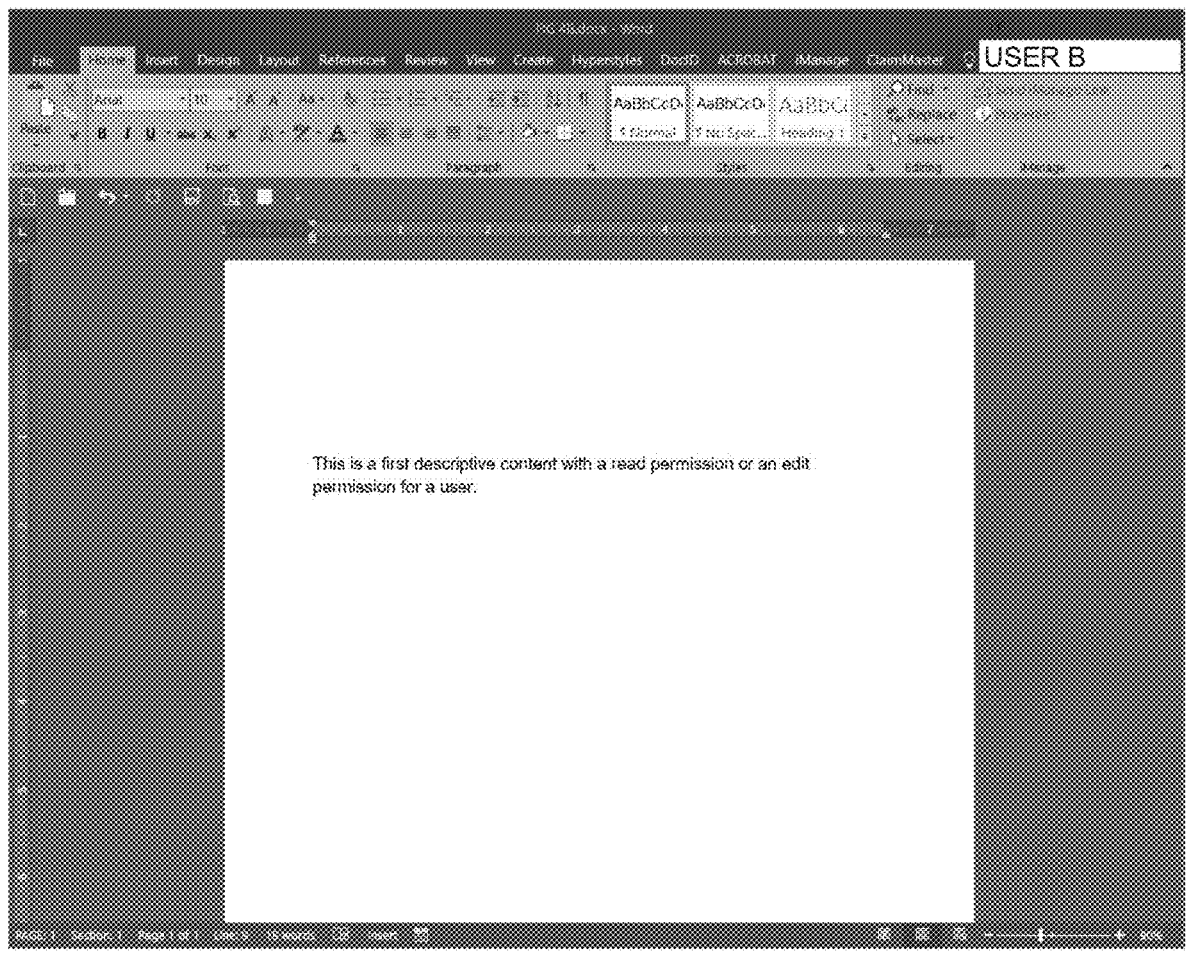
FIG. 4B shows a screenshot of an embodiment of a productivity document with a first descriptive content permissioned for a first user profile (User A) and a second descriptive content permissioned for a second user profile (User B) when the productivity document is opened via the second user profile according to this disclosure.

FIG. 4B shows a screenshot of an embodiment of a productivity document with a first descriptive content permissioned for a first user profile (User A) and a second descriptive content permissioned for a second user profile (User B) when the productivity document is opened via the second user profile according to this disclosure. As illustrated, the productivity document is opened by the productivity application 120 for a User B embodied as the third user profile, as explained above. Therefore, since the User B is embodied as the third user profile, the productivity application 120 presents the first descriptive content to the User B but does not present the second descriptive content to the User B, unless the User A permissions the User B to do so, as explained above.

In addition, features described with respect to certain example embodiments may be combined in or with various other example embodiments in any permutational or combinatory manner. Different aspects or elements of example embodiments, as disclosed herein, may be combined in a similar manner. The term "combination", "combinatory," or "combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

Various embodiments of the present disclosure may be implemented in a da-ta processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to be-come coupled to other data processing systems or remote printers or storage devices through intervening private or public networks. Modems, cable modems, and Ethernet cards are just a few of the available types of network adapters.

The present disclosure may be embodied in a system, a method, and/or a computer program product. The computer program product may include a computer readable storage medium (or media) having computer readable program instructions thereon for causing a processor to carry out aspects of the present disclosure. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. A code segment or machine-executable instructions may represent a procedure, a function, a subprogram, a program, a routine, a subroutine, a module, a software package, a class, or any combination of instructions, data structures, or pro-gram statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. The various illustrative logical blocks, modules, circuits, and algorithm steps described in connection with the embodiments disclosed herein may be implemented as electronic hardware, computer soft-ware, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

Features or functionality described with respect to certain example embodiments may be combined and sub-combined in and/or with various other example embodiments. Also, different aspects and/or elements of example embodiments, as dis-closed herein, may be combined and sub-combined in a similar manner as well. Further, some example embodiments, whether individually and/or collectively, may be components of a larger system, wherein other procedures may take precedence over and/or otherwise modify their application. Additionally, a number of steps may be required be-fore, after, and/or concurrently with example embodiments, as disclosed herein. Note that any and/or all methods and/or processes, at least as disclosed herein, can be at least partially performed via at least one entity or actor in any manner.

Although preferred embodiments have been depicted and described in detail herein, skilled artisans know that various modifications, additions, substitutions and the like can be made without departing from spirit of this disclosure. As such, these are considered to be within the scope of the disclosure, as defined in the following claims.

What is claimed is:

1. A system comprising:
a computing instance that is programmed to:
host a first repository, a second repository, a first user profile dedicated to accessing the first repository and not accessing the second repository, a second user profile dedicated to accessing the first repository and not accessing the second repository, a third user profile dedicated to accessing the first repository and not accessing the second repository, and a productivity application operative via the first user profile, the second user profile, and the third user profile;
create a productivity document in the first repository based on a first user input sourced from a first client logged in as the first user profile such that the productivity document is stored in the first repository and unable to be moved or copied from the first repository to the second repository within the computing instance by the first user profile, the second user profile, and the third user profile, wherein the productivity document contains a first descriptive content that is editable by the productivity application and a second descriptive content that is editable by the productivity application, wherein the first user profile is permissioned to read the productivity document in its entirety, edit the productivity document in its entirety, and remove the productivity document from the first repository, wherein the productivity document is associated with a creator identifier identifying the first user profile based on the first user input;
receive a second user input sourced from a second client logged in as the second user profile, wherein the second user profile proxying for the first user profile to assign a read permission for the first descriptive content or the second descriptive content to the third user profile, a no-read permission for the first descriptive content or the second descriptive content to the third user profile, or an edit permission for the first descriptive content or the second descriptive content to the third user profile, wherein the second user profile is permissioned to read the productivity document in its entirety and edit the productivity document in its entirety, wherein the second user profile is not permissioned to edit the creator identifier and to remove the productivity document from the first repository;
receive a third user input sourced from a third client logged in as the third user profile after assigning the read permission or the edit permission for the first descriptive content to the third user profile based on the second user input and the no-read permission for the second descriptive content to the third user profile based on the second user input;
allow the productivity application to open the productivity document on the third client based on the third user input such that the first descriptive content is displayed within the productivity application on the third client based on the read permission or the edit permission and the second descriptive content is not displayed within the productivity application on the third client based on the no-read permission; and
revoke the read permission or the edit permission, and the no-read permission from the third user profile based on the third user profile being dedicated to accessing the second repository and not accessing the first repository.

2. The system of claim 1, wherein the computing instance is further programmed to:
form a copy of the productivity document in the first repository such that the copy contains the first descriptive content and the second descriptive content and inherits the read permission or the edit permission to the first descriptive content for the third user profile and the no-read permission to the second descriptive content for the third user profile;
allow the productivity application to open the copy on the third client such that the first descriptive content of the copy is displayed within the productivity application on the third client based on the read permission or the edit permission as inherited and the second descriptive content of the copy is not displayed within the productivity application on the third client based on the no-read permission as inherited; and
revoke the read permission or the edit permission as inherited, and the no-read permission as inherited from the third user profile based on the third user profile being dedicated to accessing the second repository and not accessing the first repository.

3. The system of claim 1, wherein the computing instance is further programmed to:
form a new version of the productivity document in the first repository such that the new version contains the first descriptive content, the second descriptive content, and a third descriptive content and inherits the read permission or the edit permission to the first descriptive content for the third user profile and the no-read permission to the second descriptive content for the third user profile;
allow the productivity application to open the new version on the third client such that the first descriptive content of the new version is displayed within the productivity application on the third client based on the read permission or the edit permission as inherited and the second descriptive content of the new version is not displayed within the productivity application on the third client based on the no-read permission as inherited; and
revoke the read permission or the edit permission as inherited, and the no-read permission as inherited from the third user profile based on the third user profile being dedicated to accessing the second repository and not accessing the first repository.

4. The system of claim 1, wherein the computing instance is further programmed to:
receive a request sourced from the third client logged in as the third user profile, wherein the request requests a grant of the read permission or the edit permission to the second descriptive content for the third user profile;
receive a response to the request from the second client logged in as the second user profile, wherein the response provides the grant of the read permission or the edit permission to the second descriptive content for the third user profile such that the second descriptive content is displayed within the productivity application on the third client logged in at the third user profile based on the grant.

5. The system of claim 4, wherein the computing instance is further programmed to present a user interface within the productivity application to the third client logged in as the third user profile, wherein the user interface presents the first descriptive content based on the read permission or the edit permission and does not present the second descriptive content based on the no-read permission, wherein the user interface presents a user input element external to the first descriptive content, wherein the user input element is programmed to initiate the request upon activation of the user input element such that the second descriptive content is presented within the user interface based on the response being received.

6. The system of claim 5, wherein the productivity document has a format, wherein the computing instance is further programmed to display the second descriptive content within the user interface on the third client logged in at the third user profile based on the grant such that the format of the productivity document does not change.

7. The system of claim 5, wherein the productivity document has a format, wherein the computing instance is further programmed to display the second descriptive content within the user interface on the third client logged in at the third user profile based on the grant such that the format of the productivity document is changed.

8. The system of claim 1, wherein each of the first user profile dedicated to accessing the first repository and not accessing the second repository, the second user profile dedicated to accessing the first repository and not accessing the second repository, and the third user profile dedicated to accessing the first repository and not accessing the second repository is respectively based on each of the first user profile, the second user profile, and the third user profile being assigned to a tree that hierarchically lists a first profile identifier corresponding to the first user profile, a second profile identifier corresponding to the second user profile, and a third profile identifier corresponding to the third user profile, wherein the tree corresponds to the first repository and not the second repository.

9. The system of claim 8, wherein the tree is a first tree, and wherein the computing instance is further programmed to revoke the read permission or the edit permission, and the no-read permission from the third user profile based on the third user profile being dedicated to accessing the second repository and not accessing the first repository responsive to the third profile identifier being removed from the first tree and added to a second tree corresponding to the second repository and not the first repository.

10. The system of claim 9, wherein the third profile identifier is removed from the first tree and added to the second tree via a drag-and-drop operation.

11. The system of claim 9, wherein the third profile identifier is removed from the first tree and added to the second tree via the second user profile.

12. The system of claim 9, wherein the third profile identifier is removed from the first tree and added to the second tree via the first user profile.

13. The system of claim 1, wherein the no-read permission is an affirmative no-read permission for the first descriptive content or the second descriptive content to the third user profile.

14. The system of claim 1, wherein the no-read permission is based on an absence of the read permission for the first descriptive content or the second descriptive content to the third user profile or an absence of the edit permission for the first descriptive content or the second descriptive content to the third user profile.

15. The system of claim 1, wherein the productivity application presents a visual notice of the second descriptive content not being displayed on the third client logged in as the third user profile based on the no-read permission.

16. The system of claim 15, wherein the productivity application includes a document area containing the first descriptive content and the visual notice.

17. The system of claim 16, wherein the document area presents the visual notice over an area where the second descriptive content is positioned in the productivity document when displayed.

18. The system of claim 16, wherein the visual notice is color-coded to be visually distinct relative to the first descriptive content.

19. The system of claim 15, wherein the productivity application includes a command menu for the productivity document and a document area containing the first descriptive content, wherein the visual notice is on the command menu, wherein the command menu is positioned adjacent to the document area.

20. The system of claim 15, wherein the productivity application includes a command menu for the productivity document and a document area containing the first descriptive content, wherein the visual notice is external to the command menu and the document area, wherein the command menu is positioned adjacent to the document area.

21. The system of claim 1, wherein the second descriptive content is not displayed by being hidden within the productivity application on the third client based on the no-read permission.

22. The system of claim 1, wherein the second descriptive content is not displayed by being blocked-off within the productivity application on the third client based on the no-read permission.

23. The system of claim 1, wherein the third user profile is a team profile corresponding to a group of user profiles other than the first user profile and the second user profile.

24. The system of claim 1, wherein the computing instance is further programmed to enable the second descriptive content to not be displayed within the productivity application on the third client based on the no-read permission when the productivity application is shared via a videoconferencing session.

25. The system of claim 1, wherein the computing instance is further programmed to enable the second descriptive content to not be displayed within the productivity application on the third client based on the no-read permission when the productivity application is accessed via a screen-capture application.

26. The system of claim 1, wherein the computing instance is further programmed to:
receive a request sourced from the third client logged in as the third user profile, wherein the request requests a copy of the productivity document to be downloaded or emailed to a fourth user profile other than the first user profile and the second user profile;
omit or remove the second descriptive content from the copy before the copy is made available for download or emailing to the fourth user profile.

27. The system of claim 1, wherein the computing instance is further programmed to:
assign the read permission for the first descriptive content or the second descriptive content to the third user profile, the no-read permission for the first descriptive content or the second descriptive content to the third user profile, or the edit permission for the first descriptive content or the second descriptive content to the third user profile based on reading a set of entries stored in a log in existence before receiving the second user input from the second client logged in as the second user profile.

28. The system of claim 1, wherein the productivity application is a first productivity application, wherein the productivity document is a first productivity document, wherein the computing instance is further programmed to:
host a second productivity application;
receive a fourth user input sourced from the third client logged in as the third user profile after the read permission or the edit permission for the first descriptive content is assigned to the third user profile based on the second user input and the no-read permission for the second descriptive content is assigned to the third user profile based on the second user input; and
allow the second productivity application to open a second productivity document on the third client based on the fourth user input such that the first descriptive content is displayed within the second productivity application on the third client based on the read permission or the edit permission and the second descriptive content is not displayed within the second productivity application on the third client based on the no-read permission.

29. The system of claim 1, wherein the computing instance is further programmed to revoke the read permission or the edit permission, and the no-read permission from the third user profile based on the third user profile being dedicated to accessing the second repository and not accessing the first repository in response to a revocation input sourced from the first client logged in as the first profile.

30. The system of claim 1, wherein the computing instance is further programmed to revoke the read permission or the edit permission, and the no-read permission from the third user profile based on the third user profile being dedicated to accessing the second repository and not accessing the first repository in response to a revocation input sourced from the second client logged in as the second profile.

31. The system of claim 1, wherein the computing instance is further programmed to:
host a first hierarchy of user profiles permissioned to access the first repository and not the second repository and a second hierarchy of user profiles permissioned to access the second repository and not the first repository, wherein the first hierarchy of user profiles contains the first user profile, the second user profile, and the third user profile, wherein the first user profile is listed hierarchically higher than the second user profile and the third user profile in the first hierarchy of user profiles, wherein the second user profile is listed hierarchically higher than the third user profile in the first hierarchy of user profiles; and
revoke the read permission or the edit permission, and the no-read permission from the third user profile based on the third user profile being dedicated to accessing the second repository and not accessing the first repository via removing the third user profile from the first hierarchy of user profiles and adding the third user profile to the second hierarchy of user profiles.

32. The system of claim 1, wherein the computing instance includes a file system and is further programmed to assign the read permission or the edit permission for the first descriptive content to the third user profile based on the second user input and the no-read permission for the second descriptive content to the third user profile independent of the file system.

33. The system of claim 1, wherein the computing instance includes a file system and is further programmed to assign the read permission or the edit permission for the first descriptive content to the third user profile based on the second user input and the no-read permission for the second descriptive content to the third user profile in concert with the file system.

34. A system comprising:
a computing instance that is programmed to:
host a first hierarchy of user profiles, a second hierarchy of user profiles, a first repository, and a second repository such that the first hierarchy of user profiles is permissioned to access the first repository and not the second repository and the second hierarchy of user profiles is permissioned to access the second repository and not the first repository;
receive a creation user input and a permission user input from a first profile of the first hierarchy of user profiles, wherein the creation user input creates a productivity document in the first repository such that the productivity document is stored in the first repository and unable to be moved or copied from the first repository to the second repository within the computing instance by the first user profile, wherein the productivity document contains a first descriptive content that is editable by the productivity application and a second descriptive content that is editable by the productivity application, wherein the first user profile is permissioned to read the productivity document in its entirety, edit the productivity document in its entirety, and remove the productivity document from the first repository, wherein the permission user input assigns a read permission for the first descriptive content or the second descriptive content to a second user profile of the first hierarchy of user profiles, a no-read permission for the first descriptive content or the second descriptive content to the second user profile, or an edit permission for the first descriptive content or the second descriptive content to the second user profile, wherein the productivity document is stored in the first repository and unable to be moved or copied from the first repository to the second repository within the computing instance by the second user profile, wherein the first user profile is listed hierarchically higher than the second user profile in the first hierarchy of user profiles;
receive an access request from the second user profile after the read permission or the edit permission for the first descriptive content is assigned to the second user profile based on the permission user input and the no-read permission for the second descriptive content is assigned to the second user profile based on the permission user input;
allow the productivity application to open the productivity document for the second profile based on the permission user input responsive to the access request such that the first descriptive content is presented within the productivity application for the second user profile based on the read permission or the edit permission and the second descriptive content is not presented within the productivity application for the second user profile based on the no-read permission; and revoke the read permission or the edit permission, and the no-read permission from the second user profile based on the second user profile being removed from the first hierarchy of user profiles and added to the second hierarchy of profiles.

\* \* \* \* \*